United States Patent [19]
De Land, Jr.

[11] 3,962,726
[45] June 8, 1976

[54] SELF-CLOCKING MAGNETIC RECORD SENSING SYSTEM

[75] Inventor: Robert Sutherland De Land, Jr., Torrance, Calif.

[73] Assignee: Mag-Tek, Inc., Carson, Calif.

[22] Filed: Feb. 21, 1975

[21] Appl. No.: 551,875

[52] U.S. Cl. .............................. 360/51; 360/45
[51] Int. Cl.² .................................. G11B 5/09
[58] Field of Search ............... 360/51, 52, 53, 45, 360/43

[56] References Cited
UNITED STATES PATENTS

| | | | |
|---|---|---|---|
| 3,689,903 | 9/1972 | Agravalz et al. | 360/51 |
| 3,711,843 | 1/1973 | Galvagni | 360/45 |
| 3,810,234 | 5/1974 | Monerr | 360/51 |
| 3,827,078 | 7/1974 | Bauer | 360/45 |
| 3,838,448 | 9/1974 | Garde et al. | 360/45 |

*Primary Examiner*—Vincent P. Canney
*Attorney, Agent, or Firm*—Nilsson, Robbins, Dalgarn & Berliner

[57] ABSTRACT

A system is disclosed for sensing a single moving magnetic track, to provide two distinct binary signals (clock and binary data) representative of digital information. Magnetically recorded signals in the Manchester or F/2F code format are selectively processed into electrical representations, using time and amplitude criteria to verify and distinguish between clock (sync) pulses and binary data pulses. An amplitude discriminator is controlled on the basis of the amplitude of immediately prior signals as well as the character of prior binary data pulse signals. A time discriminator is controlled (to segregate clock and data pulse signals) on the basis of the interval of immediately prior signals as well as the character (1 or 0) of prior binary data pulse signals. Consequently, the system is tolerant with regard to signal quality and speed consistency of the relative motion.

9 Claims, 6 Drawing Figures

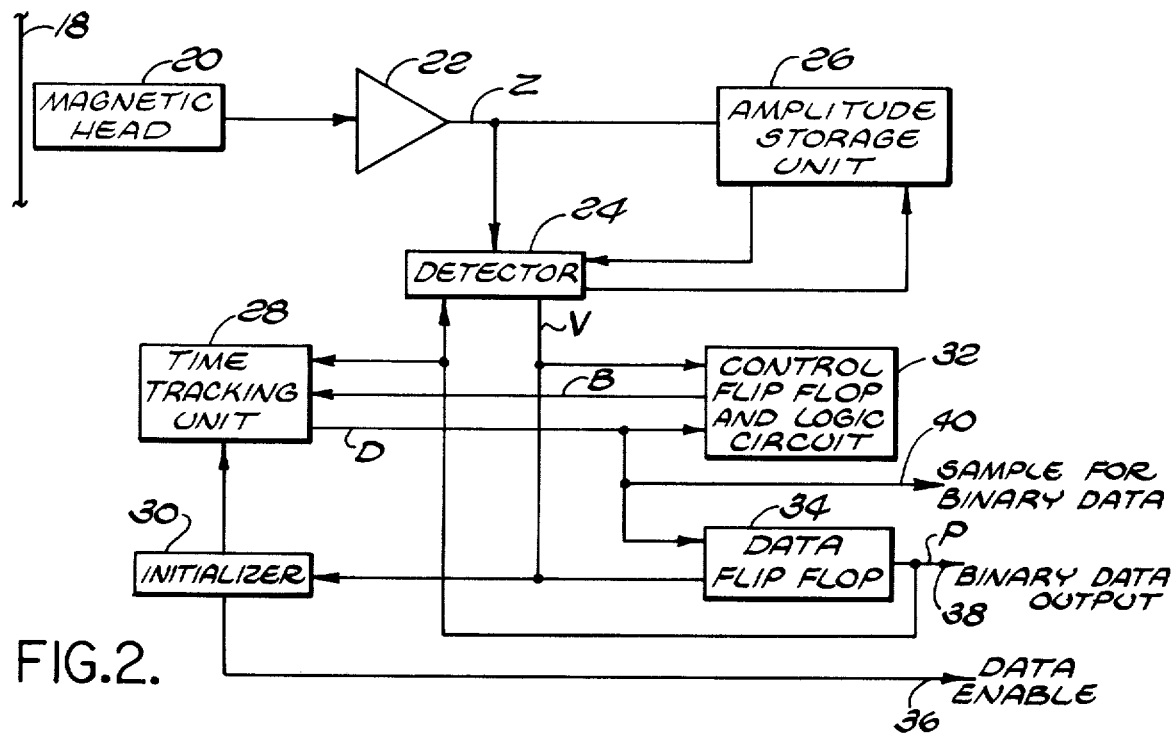
FIG.2.
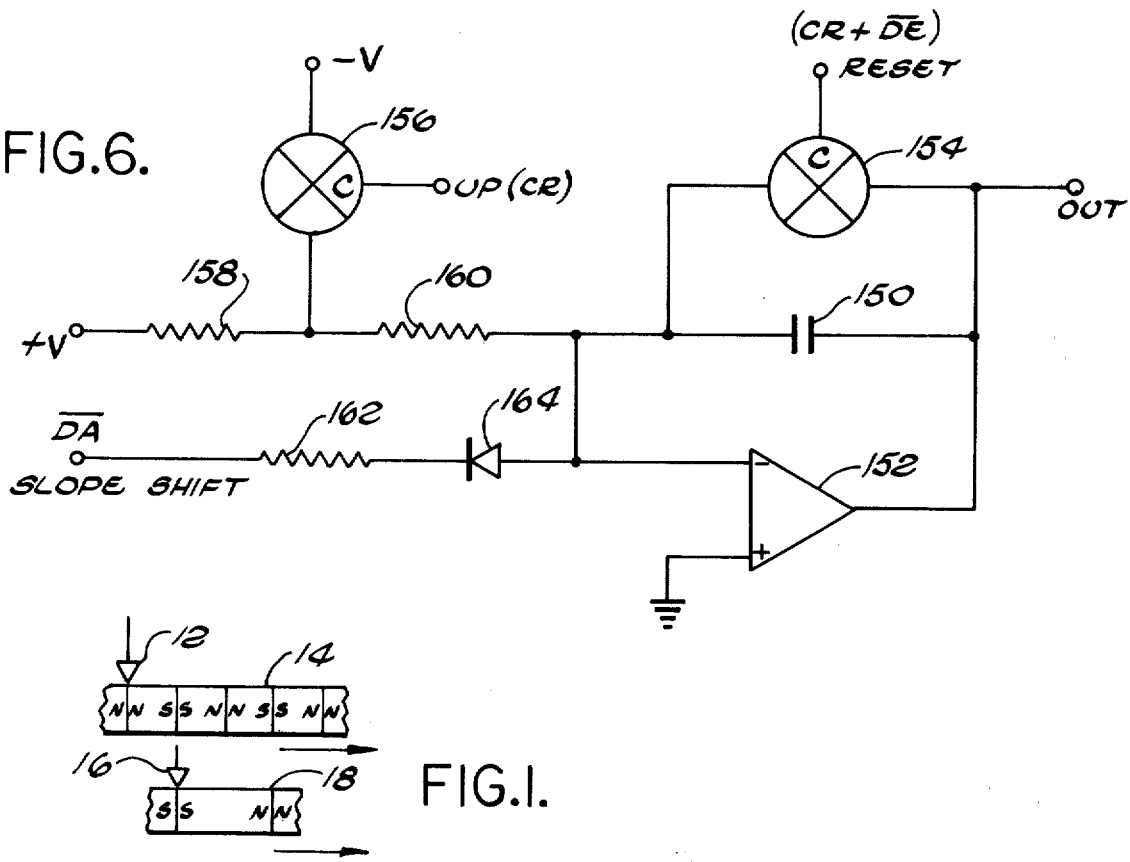
FIG.6.
FIG.1.

SELF-CLOCKING MAGNETIC RECORD SENSING SYSTEM

BACKGROUND AND SUMMARY OF THE INVENTION

Dynamic magnetic recording techniques have advanced to the state of attaining very reliable and compact records for digital data. As a result, binary data records are widely used on magnetic tapes, discs, strips and so on. Recognizing the wide variety of single-track, self-clocking formats for magnetically recording information, one recording format in general use has been variously referred to as F/2F recording, also known as Aiken F/2F, which is one of a class of codes known as Manchester codes. That format records both binary code data and timing information (clock or sync signals) in a single magnetic track. Essentially, the sync pulses are recorded at regular intervals by a magnetic discontinuity in the form of contiguous magnetic poles, i.e. either N—N or S—S. So recorded, the sync pulses define spaces therebetween for receiving either a binary data pulse (indicative of a binary "one") or no pulse (indicative of a binary "zero"). The binary data pulses are also recorded as magnetic discontinuities. Recorded pulses must alternatively be north and south poles to accommodate stable magnetic domains. Accordingly, both sync pulses and binary data pulses may be represented by abutting poles of either polarity, discrimination between sync and binary being accomplished by time tracking techniques.

In recording binary information in accordance with the above format, it is conventional practice to record a preliminary code in the track to initiate the time tracking operation for distinguishing between sync pulses and binary data pulse signals. The difficulty of maintaining proper time tracking (to segregate sync and data pulses) is related to the quality of the magnetic record and the precision with which it is moved in relation to the transducer head, e.g. uniformity of speed and spacing between head and medium. In advanced technology equipment, as computer peripheral magnetic tape units utilizing current state of the art, little difficulty would be expected to be encountered. However, a substantial number of magnetic recording applications exist which involve considerable difficulty in this regard. For example, magnetic strip credit cards carry a recording medium which must be expected to experience considerable adverse treatment. Furthermore, it is sometimes desirable to sense or "read" the magnetic stripes of such cards using a manual apparatus, e.g. handheld and manually moved unit. Such an apparatus illustrates the need for a magnetic sensing system with considerable tolerance for speed variations and record deterioration. In general, the present invention affords reliable magnetic sensing and signal processing in applications involving adverse conditions.

The disclosed embodiment of the present invention utilizes amplitude discrimination to reject spurious signals, the threshold level being established in accordance with the strength (amplitude) of prior signals and the character of prior binary data. In F/2F data recording, if a prior binary bit was manifest by a pulse, e.g. conventionally a "one", then the pulse density of the record is increased which reflects upon the signal amplitude as well known in the prior art, and in accordance with the present invention is compensated correctively. Pulse density also reflects on the position (time and space related) at which recorded data is observed. In the present system, time tracking to distinguish sync and binary data pulses reflects the character of a prior binary data pulse signal as an element of control.

BRIEF DESCRIPTION OF THE DRAWINGS

The drawings, disclosing illustrative embodiments of the present invention, serve to present the various objectives and advantages hereof and are as follows:

FIG. 1 is a symbolic representation illustrative of the packing density effects of recorded binary data;

FIG. 2 is a block diagram of a sensing system constructed in accordance with the present invention;

FIG. 6 is a circuit diagram of a recurring unit generally illustrated in FIG. 5.

DESCRIPTION OF THE ILLUSTRATIVE EMBODIMENT

Figure 3:
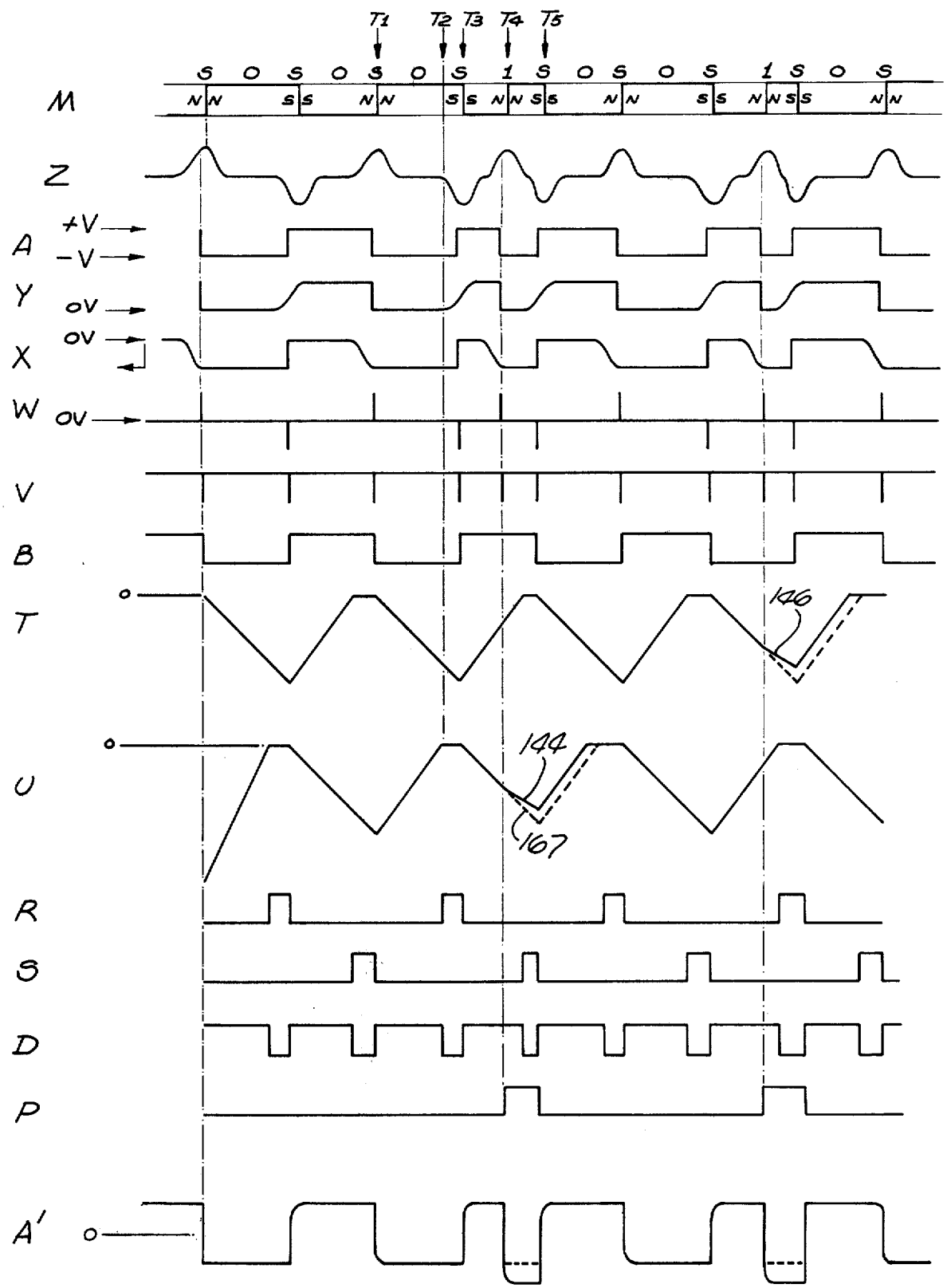
FIG. 3 is a graph of wave forms, substantially representative of signals which may occur in the system of FIG. 2.

The disclosed embodiment exemplifies the invention in what is presently considered the best mode of operation for the purpose of illustration, recognizing of course that the invention may be embodied in various other forms some of which may be radically different from the illustrative embodiment. However, the specific structural and functional details disclosed herein are representative and provide a basis for the claims herein which define the scope of the invention.

Referring initially to FIG. 1, two independent magnetic track sensing situations are depicted to illustrate different possibilities. In the upper representation, a transducer head 12 is illustrated with reference to a moving track 14 such that the head 12 has just sensed a sequence including: a sync pulse, a binary data pulse and a sync pulse in that order. The next event with further sensing will involve determining whether a binary data pulse ("one") or no data pulse ("zero") follows the last sync pulse indicated by a discontinuity N-N.

Referring to the lower representation in FIG. 1, the same next event is posed as in the upper representation. However, as illustrated in the lower representation, the transducer head 16 has just sensed two sync pulses with no intermediate binary data pulse. Consequently, the lower representation has sensed a portion of the recording track which involves lower packing density. The present invention is based upon the recognition that effectively determining the presence (or absence) of a binary data pulse during the interval as represented by the next event of each of the situations in FIG. 1, involves distinguishing between the two represented situations involving different packing densities.

If a binary data pulse follows as the next event of the situation in the upper representation, the just-passed binary data pulse discontinuity (S—S) will effect the signal to be sensed. That is, if a discontinuity exists to indicate a binary data pulse in the next portion of the track, the discontinuity will be similar to the last binary pulse discontinuity (S—S). Consequently, the prior data pulse discontinuity will contribute to the flux of the supposed or possible next binary data pulse. Therefore, as illustrated by this representative situation, after the occurrence of a binary data pulse, the next potential binary data pulse (if present) can be expected to manifest an occurrence that is equal or sooner and at an equal or higher level of amplitude than the previous. Thus, the criteria: following a binary data pulse, look sooner in time and at a higher level of amplitude. Conversely, following the absence of a binary data pulse (manifesting a "zero"), look later and lower.

Referring now to FIG. 2, a system based upon a recognition of the above criteria will now be considered in detail. A strip 18 of moving magnetic tape is represented in sensing relationship with an inductive magnetic transducer head 20. In accordance herewith, the recording format for the strip 18 is as indicated by the first line M in FIG. 3. Essentially, magnetic discontinuities in the form of abutting similar poles indicate either sync pulses or binary data pulses. Sync pulses are indicated by a letter "S" above the discontinuity. Binary data pulses (representative of "one") are indicated by the numeral 1 above the discontinuity and binary data pulse signals (no pulse, indicative of a "zero") are indicated by a 0.

As well known in the magnetic recording art, the record format of the strip 18 may be sensed, as by the head 20, to provide positive and negative pulses representative of the magnetic discontinuities. In accordance with convention, as illustrated in FIG. 2, the magnetic head 20 is connected to an amplifier 22 which provides the representative signal, wave form z of FIG. 3. With regard to this description, it is here noteworthy that the letters serving to identify various wave forms in FIG. 3 are employed in FIGS. 2, 4 and 5 to designate locations of such wave forms.

The output from the amplifier 22, ideally consisting of alternate negative and positive pulses, is applied to a detector 24 and an amplitude storage unit 26. The details of these circuits are considered below; however, at this point in the description it is to be appreciated that the amplitude storage unit 26 stores a threshold amplitude, the level of which is controlled by the amplitude of the sensed signal during the immediately prior period, which threshold is applied from the unit 26 to the detector 24 to discriminate against signals of lesser amplitude as spurious.

The detector 24 also receives the binary output (wave form P, FIG. 3) the development of which is treated in detail below. Also as explained in detail, the amplitude discrimination accomplished by the detector 24 reflects the character of the immediately past binary pulse signal. That is, as indicated above, the effects on the amplitude of pulse crowding due to packing density are recognized and control is appropriately exercised in the discrimination operation.

The detector 24 provides an output comprising narrow pulses or spikes (wave form V, FIG. 3) which coincide to the leading sides of the sensed pulses (wave form Z). As indicated above, the details of the detector 24 are considered below; however, at the present point in the description it should be understood that spikes (all of similar polarity) are provided from the detector 24 representative of sensed pulses. As indicated in the wave form V (FIG. 3), the spikes define sync pulses S which are substantially equally spaced to provide positions for binary data pulse signals between. The occurrence of a pulse in such a position manifests a "one" while the occurrence of no pulse manifests a "zero". Of course, it is critical to the operation of the system that time tracking be maintained to distinguish between sync pulses and binary data pulses. As represented in FIG. 2, the time tracking is performed by a time-tracking unit 28. Initially, the proper time tracking sequence is established by an initializer 30 which is connected to receive sensed pulses (wave form V) from the detector 24 to initially set the tracking unit 28. In accordance with convention, a set of initializing pulses are provided at the beginning of a magnetic record for initiating proper time tracking sequence. Again, the details of the initializer 30 along with the time-tracking unit 28 are described below.

The continued operation of the time-tracking unit 28 involves a control loop including a control flip flop and logic circuit 32 and a data flip flop 34. In that regard, the unit 28 provides and receives signals (wave forms B and D) to and from the circuit 32. The data flip flop 34 is also connected to the unit 28 and is in turn connected to the time tracking unit 28 and detector 24. These components function to provide three specific outputs for manifesting data or information. Specifically, a "data enable" output 36 is in the form of a binary signal which is high during intervals when data is being presented and is low during the quiescent state of the system. A "binary code" output 38 (wave form P) manifests the binary data while a "sample for binary code" output 40 manifests the output clock pulses (wave form D). Thus, in accordance with conventional format, the system functions to provide three output signals manifesting clocked binary data.

Figure 4:
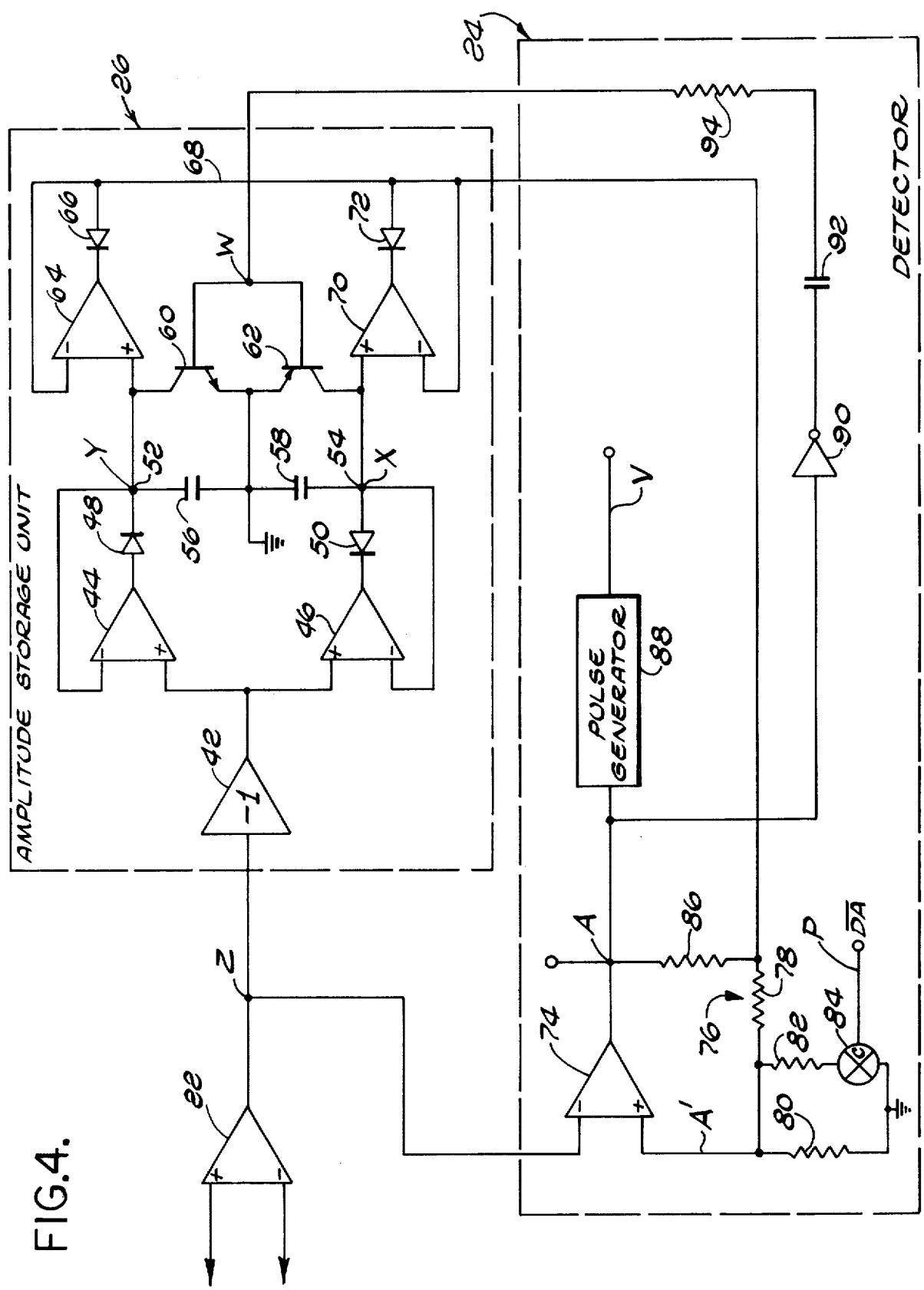
FIG. 4 is a circuit diagram of a portion of the system of FIG. 2.
Figure 5:
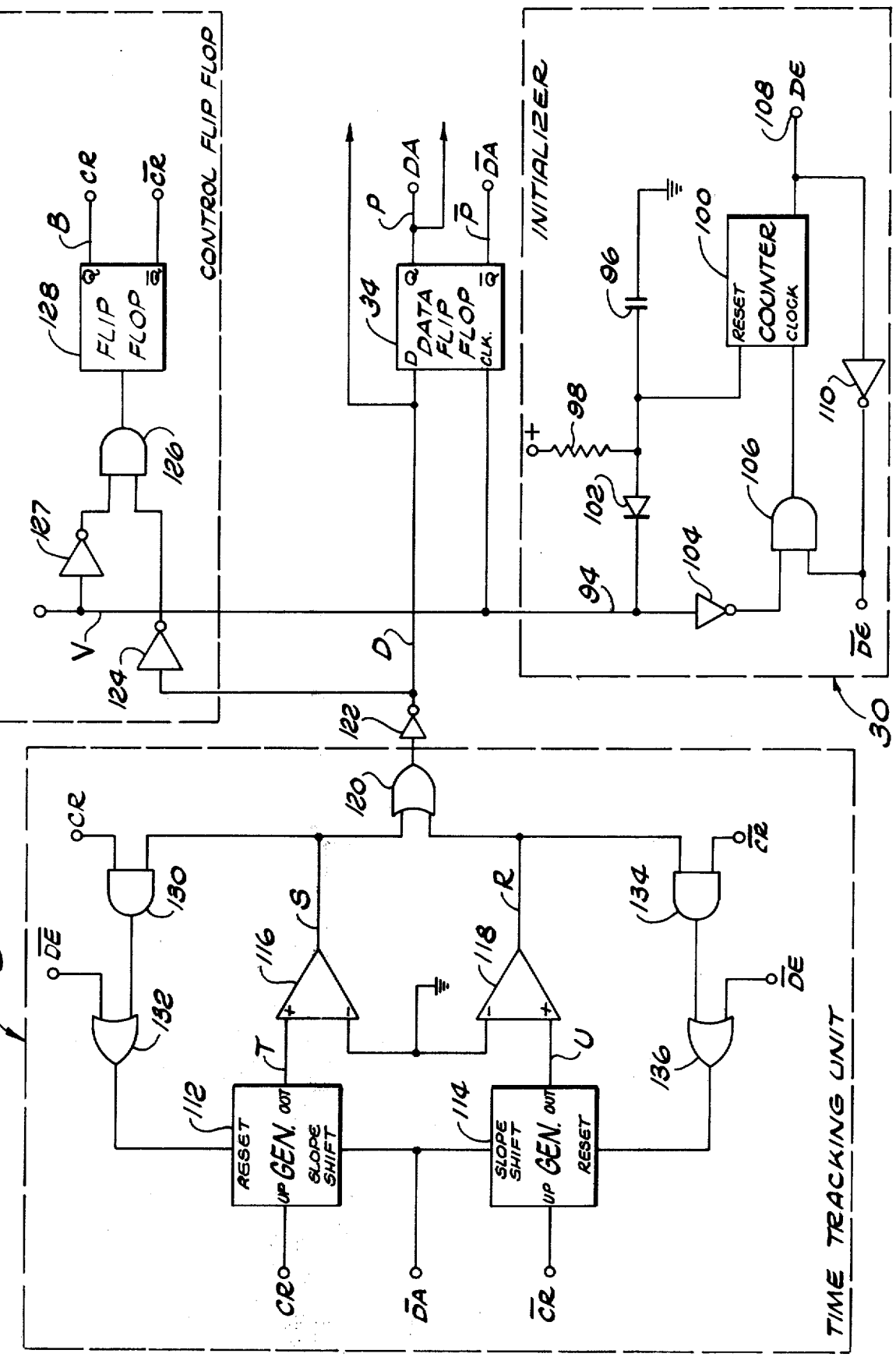
FIG. 5 is a logic and circuit diagram of another portion of the system of FIG. 2.

Considering the detailed operation of the system of FIG. 2, reference will now be made to FIG. 4 for a description of the amplitude storage unit 26 and the detector 24 which formulate the threshold means for amplitude discrimination. Recapitulating to some extent, the amplifier 22 (upper left) receives signals sensed by an inductive magnetic head as very well known in the prior art. The output from the amplifier 22 is applied to the unit 26 and the detector 24. Within the amplitude storage unit 26, the sensed signal (wave form Z) is phase inverted by an inverting amplifier 42 and applied to the positive inputs of operating amplifiers 44 and 46, the outputs of which are connected through oppositely poled diodes 48 and 50 to junction points 52 and 54, respectively. It is noteworthy that the wave forms Y and X (FIG. 3) appear respectively at the junction points 52 and 54 as a result of alternate charging of a pair of capacitors 56 and 58. Physically, the junction point 52 is returned to the negative input of the operating amplifier 44 and additionally is connected through the capacitor 56 to ground potential. Somewhat similarly, the junction point 54 is returned to the negative input of the amplifier 46 and is connected through the capacitor 58 to ground potential. A pair of oppositely poled transistors 60 and 62 are connected across the capacitors 56 and 58, respectively, and are controlled to alternately discharge or reset the capacitors.

The junction point 52 is also connected to the positive input of an operating amplifier 64 which is connected through a diode 66 to provide a threshold level through a conductor 68 to the detector 24. A return path to the negative input of the operating amplifier 64 is also provided from the conductor 68. Somewhat similarly, an operating amplifier 70 has a positive input connected to the junction point 54 and is connected through diode 72 to the conductor 68 with a return connection to the negative input. Functionally, the amplifiers 44 and 46 alternately charge capacitors 56 and 58, respectively, to store peak levels of the received pulses. These stored signal levels serving as a basis for establishing the threshold are applied to the conductor 68 through the amplifiers 64 and 70, respectively, which isolate the capacitors 56 and 58. Alternate resetting of the capacitors 56 and 58 is accomplished by alternately triggering the transistors 60 and 62 under the control of detected pulses (wave form W). Thus, the unit 26 provides an output on conductor 68 which manifests alternate positive and negative amplitude levels for the detection of sensed pulses. The actual thresholds of detection are percentages of the stored amplitudes and additionally are controlled dependent upon the character of the last binary data pulse signal. Such control is accomplished in the detector 24 as will now be considered in detail.

The sensed signal (wave form Z) is applied from the amplifier 22 (upper left) to the negative input of a comparator 74. The positive input of the comparator 74 receives the actual threshold signal (wave form A') which is developed from the output of the amplitude storage unit 26 and the character of prior binary data. Essentially, when the amplitude of the sensed signal (wave form Z) exceeds the amplitude of the threshold signal (wave form A') the comparator provides a level shift resulting in an output (wave form A) in which pulses sensed from the magnetic track are translated into level shifts in a binary signal.

To establish the threshold (wave form A') the stored peak amplitudes received through the conductor 68 are applied to a voltage dividing network generally indicated by the numeral 76. Specifically, the conductor 68 is connected to a resistor 78 which is in turn connected to a pair of parallel resistors 80 and 82, with resistor 80 being terminated directly to ground potential and resistor 82 being similarly terminated through a controlled switch 84. Completing the circuit, a resistor 86 is connected between the conductor 68 and the output of the comparator 74.

The switch 84 is normally open, however, is controlled by the negation of the binary data signal $\overline{DA}$ (wave form P). Accordingly, the switch 84 is closed only during intervals when no binary data pulse is received. Consequently, when the switch 84 is closed, the threshold for the comparator 74 (wave form A') is isolated from ground potential by the combined (lower) resistance of the parallel resistors 80 and 82. However, upon the occurrence of a binary data pulse, the signal $\overline{DA}$ drops low, the switch 84 opens and the isolating resistance increases, being solely that of the resistor 80. Thus, the threshold of detection increases upon the occurrence of a data pulse.

Upon detection of a data pulse, the comparator 74 provides a level shift (wave form A) to a pulse generator 88 and through an inverting amplifier 90, a capacitor 92 and a conductor 94 to the base electrodes of transistors 60 and 62 (amplitude storage unit). The level shifts in the output from the comparator 74 (wave form A) are reduced to inverted spikes (wave form W) by the amplifier 90, capacitor 92, and resistor 94. Thus, controlled pulses are provided for alternately clearing or resetting the capacitors 56 and 58 in the amplitude storage unit 26 in preparation for storing the next pulse amplitude.

The pulse generator 88 similarly converts level changes to pulses, however, additionally performs a rectifying operation as well known in the prior art to provide pulse spikes of uniform polarity coinciding to level shifts in the detected signal. Essentially, the detected signal (wave form V) is processed by the remaining circuitry in the system to distinguish or segregate sync signals and binary data pulses. The structure for performing that function will now be considered in detail with reference to FIG. 5.

As indicated above, at the outset of sensing a record, it is necessary to initiate time tracking appropriately for the data to follow. Somewhat conventionally, a series of discontinuities spaced at sync intervals are recorded to provide a series of pulses which develop an enabling signal for the data. Such a function is performed by the initializer 30 (FIG. 5, lower right) which is connected to receive the uniform-polarity spikes (wave form V) indicative of sensed pulses. Consequently, at the beginning of a data track, a series of spikes or narrow pulses will appear in the conductor 94. During the quiescent state prior to the arrival of such pulses, a capacitor 96 has been charged through a resistor 98 from a potential source to a level for resetting a counter 100. Upon the occurrence of the initial pulse in the initializer sequence, the capacitor 96 is discharged through a diode 102 removing the reset signal to the counter 100. Subsequent pulses in the data chain prevent the capacitor 96 from attaining sufficient charge to reset the counter 100 as long as data is being received.

The initializing pulses are also applied from the conductor 94 through an inverting amplifier 104 to an "and" gate 106 the output of which is applied to actuate the counter 100. The "and" gate 106 is qualified by the signal DE, which is the negation of the data enable signal $\overline{DE}$. In that regard, when the counter 100 is loaded, the data enable signal DE is provided at a terminal 108. Furthermore, the signal DE is applied to the "and" gate 106 through an inverting amplifier 110. Of course, prior to the initializing process, the counter 100 was reset, consequently the "and" gate 106 was qualified so that the initializing pulses clock the counter 100. The count of the counter 100 required to provide a high output at the terminal 108 is set to coincide to the minimum number of initializing pulses that are provided on records to be sensed. Thus, the initializing pulses received in the conductor 94 discharge the capacitor 96 to remove the reset signal then actuate the counter to an accumulated value at which the data enable signal DE becomes high. The interval immediately following that occurrence is designated as a location for binary data. From that initial time interval, the time-tracking unit 28 (FIG. 5) functions to segregate and distinguish sync pulses from data pulses somewhat in a loop configuration with the control flip flop 32. That structure will now be considered with continued reference to FIG. 5.

Generally, the time-tracking unit includes a pair of ramp generators 112 and 114 which operate substantially in phase opposition to provide sawtooth wave forms T and U, the positive slopes of which define the interval for sensing the presence of binary data pulse signal, i.e. either a pulse or no pulse. Essentially, the slope generators 112 and 114 alternately provide ramps to comparators 116 and 118, respectively, which are also connected to a source of ground reference potential. As the generators 112 and 114 alternately provide a positive-going slope, the intervals for binary digital signals are defined. That the reference potential has been attained is detected by the associated comparator 116 or 118 to provide a sample edge. Specifically, the comparator 116 provides one set of alternate pulses (wave form S) while the comparator 118 provides the other set of alternate sample pulses (wave form R). These pulses are combined by an "or" gate 120 and inverted by an amplifier 122 to provide the output sample edges for binary code, clock pulses as they are sometimes referred to (wave form D). Additionally, the sample pulses (wave form D) are applied through an inverting amplifier 124 to qualify an "and" gate 126 which receives the spikes of wave form V through an inverting amplifier 127. Thus, the location of sync pulses anticipated by the time-tracking circuit 28 is confirmed by a detected sync pulse to qualify the "and" gate and trigger the control flip flop 128 which provides the control signal CR and its negation (wave form B). The signal CR (and its negation $\overline{CR}$) are employed in the time-tracking unit 28 to sequence the slope generators 112 and 114. Specifically, when the output of the comparator 116 (wave form S) goes high, an "and" gate 130 is qualified with the result that upon the occurrence of the signal CR, the gate 130 supplies a reset level to the slope generator 112 through an "or" gate 132. The slope generator 114 is somewhat inversely qualified, being controlled by an "and" gate 134 which receives one input (wave form R) from the comparator 118 and another input in the form of the negation signal $\overline{CR}$. The output from the "and" gate 134 is through an "or" gate 136 to the reset input of the slope generator 114. It is to be noted that the "or" gates 132 and 136 also receive the negation signal $\overline{DE}$ which maintains the slope generators reset pending the state of "data enable".

Thus, the time-tracking unit 28 in cooperation with the control flip flip 32 provides the sample pulses (wave form D) which are also applied to the data flip flop 34 which is somewhat conventional in a form sometimes referred to as a "D flip flop". Logically, the flip flop 34 is quiescent so long as both inputs are received. That is, the sync pulses (wave form D) coinciding with a sensed pulse (wave form V) do not actuate the flip flop 34. However, upon the occurrence of a sensed pulse (wave form V) at a time offset from a sample pulse (wave form D) actuates the data flip flop 34 to provide an output binary data of "one" at DA (wave form P). The subsequent sync (wave form V) will reset the data flip flop since the sample pulse is present. Thus, the system effectively senses and distinguishes binary data pulses from sync pulses.

As indicated above, each interval for a binary data pulse is determined with a view toward whether such a pulse was received during the immediately prior period. Such timing control is accomplished within the ramp generators 112 and 114. Generally, upon the occurrence of a data pulse DA, the negation signal $\overline{DA}$ drops low with an attendant modification in the output slope from the slope generators 112 and 114. Such slope modifications are indicated at locations 144 and 146 in the wave forms T and U of FIG. 3. Essentially, modifications to the negative slope result in the saw-tooth wave forms terminating at less negative levels so as to shorten the following positive slope. As a consequence, if a data pulse (one) is received, the result is to shorten the time interval during which we are sensing for the next data pulse. Such operation may be most effectively understood by consideration of the detailed circuit in the slope generators 112 and 114 as will now be considered with reference to FIG. 6.

The operation of the slope generators involves charging a capacitor 150 which is operated in a well known integrator fashion in combination with an operational amplifier 152. A signal-control switch 154 is connected across the capacitor 150 to accomplish reset, as by the signal $\overline{DE}$ and one of the signals CR or $\overline{CR}$ depending upon the application of the circuit to function as the generator 112 or 114. Similarly, one of these signals is applied at the "up" input to initiate charging of a capacitor 150 by controlling a switch 156 to apply a negative potential level between resistors 158 and 160 which are serially connected to the input of the operational amplifier 152. The signal for attaining a change in the slope of the slope generator is also applied to the input of the amplifier 152, through a resistor 162 and a diode 164.

In operation, the operating amplifier 152 functions in cooperation with the capacitor 150 to provide a series of timed ramps under control of the flip flop 128 (FIG. 5) which is the source of the signals CR and $\overline{CR}$. However, upon the occurrence of a data pulse, the negation signal $\overline{DA}$ drops low with the result that the diode 164 accommodates a current through the resistor 162. Consequently, the charge rate of the capacitor 150 is diminished resulting in a trailing edge of lesser slope. Accordingly, as indicated at locations 144 and 146 of the wave forms U and T, the negative excursions of the wave forms are diminished thereby shortening the following slope during which a data pulse may be observed.

Recapitulating to some extent, from the above description, the system may be seen to discriminate between true and spurious sensed signals on the basis of amplitude selectivity as well as with a view toward the character of the last binary data signal, e.g. binary data pulse or no pulse. Furthermore, the system improves the reliability of time tracking by similarly reflecting the character of the prior data signal, e.g. pulse or no pulse. A specific cycle will now be described to emphasize the operation.

Assume that the system has been initialized and has operated for a period having reached the time T1 as indicated in FIG. 3. At that instant, the slope generator 112 had attained a level of zero potential (wave form T) providing the signal S in a high state to supply a low signal (wave form D) to the data flip flop 34 and a high signal to the "and" gate 126. The qualification of the "and" gate 126 initiates the time for receiving a sync pulse. In the assumed state, the sync pulse occurs at the time T1 as indicated by the wave form Z. The pulse is detected by the comparator 74 (in detector 24, FIG. 4) to provide a level change in the output as represented by the wave form A. The pulse generator 88 senses such a level change to provide a narrow pulse or spike as indicated by the wave form V. The resulting narrow pulse at the time T1 is inverted by an amplifier 127 (FIG. 5) to qualify the "and" gate 126 and actuate the flip flop 128. As a consequence, the synchronizing interval is confirmed by the receipt of the sync pulse at the time T1. It is noteworthy that the data flip flop 34, sensing the coincidence pulses, remains quiescent recognizing the sensed pulse as a sync pulse.

Following the time T1, the sync pulse initiates the operation of the slope generator 114 (FIG. 5) to provide a positive-going slope, the interval of which may see the occurrence of a binary data pulse. As indicated in the wave forms, no such pulse occurs with the result that a "zero" is manifest. The data pulse interval is terminated when the comparator 118 is actuated at T2 to provide another sample edge. In the same manner explained above, following the time T3, the comparator 116 defines the interval for a data pulse, during which interval a data pulse appears at the instant T3. Specifically, the data pulse at T4 is sensed by the comparator 74 (FIG. 4) to provide a negative-going spike or narrow pulse as indicated in the wave form V. The occurrence of that spike without a sample pulse (wave form D) actuates the data flip flop 34 to provide the data or signal DA high and the negation signal $\overline{DA}$ low. The low level of the signal $\overline{DA}$ is applied to the slope generator 114, resulting in a change in the slope thereof, as indicated at the location 144 in the wave form U. The significant consideration is that the slope does not drop to as negative a level as would otherwise occur as indicated by the dashed line 167. Consequently, when the following sync pulse occurs at T5, the slope generator 114 initiates the slope at a less negative level. Consequently, the time period for seeking a data pulse is reduced as indicated.

The lower level of the negation data signal $\overline{DA}$ also opens the switch 84 (FIG. 4) with the result that the wave form A' drops to a lower level, i.e. more negative as indicated. As a consequence, the threshold of amplitude is effectively increased. Thus, it may be seen that the present system reflects the occurrence of a data pulse to effectively increase the amplitude threshold and anticipate the next data pulse at an earlier time. These considerations in accordance with the known effects of pulse crowding effectively improve the reliability of sensing magnetic medium and maintaining time tracking to segregate binary data and sync pulses. As indicated above, the system hereof represents a detailed embodiment of the invention; however, the scope hereof shall be in accordance with the claims as set forth below.

What is claimed is:

1. An information pulse signal processing system for use with a magnetic recording medium and relatively moving inductive head means, comprising:
    means to receive a sensed signal from said head means;
    threshold means connected to receive said sensed signal for establishing a current amplitude level in accordance with the amplitude of said sensed signal during an immediately prior period; and
    binary signal-forming means for providing a pulse upon occurrences of said sensed signal attaining a predetermined relationship with respect to said current amplitude level.

2. A system according to claim 1 wherein said threshold means includes means to provide first and second opposed-polarity amplitude levels and wherein said pulse-forming means includes means for alternately comparing said sensed signal with respect to values related to said amplitude levels to provide pulses.

3. A system according to claim 1 wherein said information pulses include synchronizing pulses separating binary data pulse signals and further includes means to vary said current amplitude level in accordance with the character of at least one of the immediately past binary data pulse signals.

4. A system according to claim 1 wherein said threshold means includes first and second capacitor means for storing first and second opposed polarity amplitude levels indicative of said sensed signal during an immediately prior period and said pulse forming means includes means for comparing said sensed signal alternately to said levels to provide a binary output.

5. A system according to claim 4 wherein said threshold means further includes means for varying said first and second opposed polarity threshold levels in accordance with the character of said sensed signal in the immediate past.

6. A system according to claim 1 further including means for defining intervals for distinguishing said information pulse signal to represent sync pulses and binary data pulse signals.

7. A system according to claim 6 further including means to vary said intervals in accordance with the character of said binary data pulse signals in the immediate past.

8. A system according to claim 7 wherein said means to vary said intervals includes a pair of variable-slope phase-opposed ramp generator means.

9. An information pulse signal processing system for use with a magnetic recording medium and relatively-moving inductive head means, comprising:
    means to receive a sensed signal from said head means;
    means for defining intervals for distinguishing said information pulse signal to represent sync pulses and binary data pulse signals; and
    means to vary said intervals in accordance with the character of said binary data pulse signals sensed in the immediate past.

* * * * *